United States Patent [19]

Hsu et al.

[11] Patent Number: 5,283,294

[45] Date of Patent: Feb. 1, 1994

[54] INVERSE PHASE POLYMERIZATION

[75] Inventors: Wen-Liang Hsu, Copley; Adel F. Halasa, Bath, both of Ohio

[73] Assignee: The Goodyear Tire & Rubber Company, Akron, Ohio

[21] Appl. No.: 892,300

[22] Filed: Jun. 2, 1992

Related U.S. Application Data

[63] Continuation-in-part of Ser. No. 443,421, Nov. 29, 1989, abandoned, which is a continuation-in-part of Ser. No. 166,087, Mar. 9, 1988, abandoned.

[51] Int. Cl.$^5$ .............................. C08F 2/06; C08F 4/70
[52] U.S. Cl. .................................. 525/247; 525/249; 525/261; 525/315
[58] Field of Search ............... 525/315, 245, 247, 248, 525/249, 250, 261

[56] References Cited

U.S. PATENT DOCUMENTS

| | | | |
|---|---|---|---|
| 4,340,685 | 7/1982 | Takeuchi et al. | 525/247 |
| 4,645,809 | 2/1987 | Bell | 526/140 |

FOREIGN PATENT DOCUMENTS

| | | | |
|---|---|---|---|
| 8015543 | 1/1983 | Japan | 525/315 |

*Primary Examiner*—James J. Seidleck
*Assistant Examiner*—Patrick R. Delaney
*Attorney, Agent, or Firm*—Alvin T. Rockhill

[57] ABSTRACT

It is sometimes advantageous to disperse crystalline polymers throughout rubbery elastomers. For instance, the cold flow characteristics and green strength of polydiene rubbers can be improved by dispersing syndiotactic-1,2-polybutadiene therein. This invention discloses a process for preparing a highly dispersed blend of a crystalline polymer in a rubbery elastomer which comprises (1) polymerizing at least one diene monomer in an organic solvent under solution polymerization conditions to form a polymer cement of the rubbery elastomer in the organic solvent, (2) polymerizing additional monomers in the polymer cement into the crystalline polymer to form a rubbery cement having the crystalline polymer dispersed therein, and (3) recovering the highly dispersed blend of the crystalline polymer in the rubbery elastomer from the organic solvent in the rubber cement.

10 Claims, No Drawings

INVERSE PHASE POLYMERIZATION

INVERSE PHASE POLYMERIZATION

This is a continuation-in-part of application Ser. No. 07/443,421, filed on Nov. 29, 1989, (now abandoned) which is a continuation-in-part of application Ser. No. 07/166,087, filed on Mar. 9, 1988 (now abandoned).

BACKGROUND OF THE INVENTION

The physical properties of elastomers can some times be improved by blending crystalline polymers therein. For example, the incorporation of syndiotactic-1,2-polybutadiene (SPBD) into rubber compositions which are utilized in the supporting carcass or innerliner of tires greatly improves the green strength of those compositions. The incorporation of SPBD into halogenated butyl rubbers which are utilized as the innerliner compositions for tires also greatly improves the scorch safety of such compositions. U.S. Pat. No. 4,274,462 further disclosed that pneumatic tires having improved resistance against heat build-up can be prepared by utilizing SPBD fibers in their tread base rubber. The green strength of high cis-1,4-polybutadiene can be improved by incorporating a small amount of crystalline trans-1,4-polybutadiene therein. These are just a few examples of improved properties which can be attained by dispersing crystalline polymers throughout rubbery elastomers.

Such blends of crystalline polymers with rubbery elastomers are typically prepared utilizing standard mixing techniques. For instance, the crystalline polymer could be mixed throughout the rubbery elastomer utilizing a Banbury mixer or a mill mixer. However, these standard mixing procedures have certain drawbacks. These drawbacks include high processing costs, polymer degradation, inadequate mixing, and process limitations. The processing equipment required in order to mix crystalline polymers throughout rubbery elastomers by mastication is expensive and very costly to operate. Such standard mixing procedures result in polymer degradation due to the high shearing forces and high temperatures which may be required for mixing. For instance, it is generally desirable to mix the crystalline polymer throughout the rubbery elastomer at a temperature which is above the melting point of the crystalline polymer. Accordingly, SPBD powder, which is utilized in tire innerliner or carcass compounds, is mixed into the compound utilizing standard mixing procedures at a temperature which is at least as high as the melting point of the SPBD being used. Since high mixing temperatures result in degradation of the rubbery elastomer being utilized as the innerliner or carcass compound, the melting point of the SPBD utilized has typically been limited to no more than about 190° C. In order to limit polymer degradation, the SPBD utilized in such applications typically has a melting point of no more than about 160° C. Even though the green strength of tire carcass compounds containing SPBD increases with the melting temperature of the SPBD, the higher mixing temperature associated with the higher melting SPBD makes its utilization very difficult because of the degradation that occurs utilizing standard mixing techniques. Furthermore, good dispersions of SPBD throughout rubbers are difficult to attain utilizing conventional mixing techniques.

SUMMARY OF THE INVENTION

By utilizing the process of this invention, good dispersions of crystalline polymers, such as SPBD, throughout rubbery elastomers can be easily and economically prepared. The technique of this invention also eliminates polymer degradation associated with high temperature mixing and eliminates many process limitations associated with conventional mixing techniques. By utilizing the process of this invention, an excellent dispersion of a crystalline matrixes throughout a continuous rubbery phase can be achieved and a high degree of crystallinity in the crystalline phase which is undisturbed by processing can be achieved. The microfibers generated in the crystalline phase are reinforcing in all directions with the microfibers having a particle size which is generally within the range of 50 to 200 microns.

The subject invention specifically discloses a process for preparing a highly dispersed blend of a crystalline polymer in a rubbery elastomer which comprises (1) polymerizing at least one diene monomer in an organic solvent under solution polymerization conditions to form a polymer cement of the rubbery elastomer in the organic solvent, (2) polymerizing additional monomers in the polymer cement into the crystalline polymer to form a rubber cement having the crystalline polymer dispersed therein, and (3) recovering the highly dispersed blend of the crystalline polymer in the rubbery elastomer from the organic solvent in the rubber cement.

The present invention also reveals a process for preparing a highly dispersed blend of a crystalline polymer in a rubbery elastomer which comprises (1) preparing a polymer cement of a crystalline polymer in an organic solvent, (2) polymerizing at least one diene monomer in the polymer cement under solution polymerization conditions to form a rubber cement having the crystalline polymer dispersed therein, and (3) recovering the highly dispersed blend of the crystalline polymer in the rubbery elastomer from the organic solvent in the polymer cement.

The subject invention further discloses a process for preparing a highly dispersed blend of syndiotactic-1,2-polybutadiene in a rubbery elastomer which comprises (1) polymerizing at least one diene monomer in an organic solvent under solution polymerization conditions to form a polymer cement of the rubbery elastomer in the organic solvent, (2) polymerizing 1,3-butadiene monomer in the polymer cement under conditions and in the presence of a catalyst which results in the formation of a rubber cement having syndiotactic 1,2-polybutadiene dispersed therein, and (3) recovering the highly dispersed blend of the syndiotactic 1,2-polybutadiene in the rubbery elastomer from the organic solvent in the rubber cement.

The present invention also reveals a process for preparing a highly dispersed blend of syndiotactic 1,2-polybutadiene in a rubbery elastomer which comprises (1) polymerizing 1,3-butadiene monomer in an organic solvent under conditions and in the presence of a catalyst which results in the formation of a polymer cement of the syndiotactic 1,2-polybutadiene in the organic solvent, (2) polymerizing at least one diene monomer in the polymer cement under conditions and in the presence of a catalyst which results in the formation of the rubbery elastomer to produce a rubber cement having syndiotactic 1,2-polybutadiene dispersed therein, and (3) recovering the highly dispersed blend of the syndiotactic 1,2-polybutadiene in the rubbery elastomer from the organic solvent in the rubber cement.

The subject invention specifically relates to a process for preparing a highly dispersed blend of a crystalline polymer in a rubbery elastomer which comprises (1) polymerizing at least one unsaturated monomer in a polymer cement of a rubbery elastomer under conditions and in the presence of a catalyst which results in the formation of a rubber cement having the crystalline polymer dispersed therein; and (2) recovering the highly dispersed blend of the crystalline polymer in the rubbery elastomer from the rubber cement.

DETAILED DESCRIPTION OF THE INVENTION

The blends of this invention are generally prepared by synthesizing a crystalline polymer in a polymer cement of a rubbery elastomer. The crystalline polymer is prepared by polymerizing one or more unsaturated monomers which are capable of being polymerized under solution polymerization conditions. Such polymerizations are normally carried out in the presence of a catalyst which results in the formation of the crystalline polymer desired. The organic solvent in the rubber cement serves as the solvent for the monomers being polymerized and the crystalline polymer prepared. A polymer cement having the crystalline polymer dispersed therein is the result of such polymerizations. Essentially homogeneous solutions of the crystalline polymer and the rubbery elastomer in the organic solvent utilized result from such polymerizations. Because the rubber cement containing the crystalline polymer produced is essentially homogeneous in nature, highly dispersed blends of the crystalline polymer in the rubbery elastomer can be recovered from the organic solvent. In other words, highly dispersed blends of crystalline polymers in rubbery elastomers can be prepared by synthesizing the crystalline polymer in a rubber cement of the rubbery elastomer. The organic solvent can then be removed utilizing conventional techniques, such as coagulation or evaporation, to recover the highly dispersed blend of the crystalline polymer in the rubbery elastomer.

It is also possible to prepare the blends of this invention by synthesizing the rubbery elastomer in a solution of the crystalline polymer. However, in most cases it will be desirable to synthesize the crystalline polymer in a cement of a rubbery elastomer. The polymerization medium utilized in the preparation of the highly dispersed blends of this invention is comprised of monomers, a catalyst, and an appropriate organic solvent. Such polymerization mediums will additionally contain polymers (the rubbery elastomer or the crystalline polymer) subsequent to the initiation of the initial polymerization. The organic solvent utilized will normally be a saturated aliphatic hydrocarbon. Aromatic hydrocarbon can be employed but are not preferred. Some examples of such aromatic solvents include benzene, toluene, xylenes, ethylbenzene, diethylbenzene, isobutylbenzene, and the like. Some representative examples of preferred aliphatic solvents include n-hexane, cyclohexane, methylcyclohexane, isohexanes, n-heptane, n-octane, isooctanes, n-decane, 2,2-dimethylbutane, petroleum ether, kerosene, petroleum spirits, petroleum naphtha, and the like. It will normally be desirable to select a solvent which is inert with respect to the catalyst system which will be employed to initiate the polymerization reaction.

The polymerization medium utilized will normally contain from about 5 weight percent to about 35 weight percent monomers and polymers based upon the total weight of the polymerization medium. Accordingly, the rubber cement ultimately produced will contain from about 5 weight percent to about 35 weight percent polymers based upon the total weight of the rubber cement. The polymerization medium or polymer cement will preferably contain from about 10 percent to about 30 percent monomers and polymers. It will generally be more preferred for the polymerization medium or polymer cement to contain from about 15 weight percent to about 25 weight percent monomers and polymers. In commercial operations, the polymerization medium or rubber cement utilized will typically contain about 20 weight percent monomers and polymer.

The rubbery elastomer cement can be prepared by polymerizing one or more diene monomers in a suitable inert organic solvent. The diene monomer utilized can be a conjugated diene monomer or a nonconjugated diene monomer. Vinyl-substituted aromatic monomers can also be copolymerized with one or more diene monomers into suitable rubbery elastomers, such as styrene-butadiene rubber (SBR). Some representative examples of suitable conjugated diene monomers that can be polymerized into rubbery elastomers include: 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnaphthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnaphthalene, 7-dodecyl-2-vinylnapthalene, α-methylstyrene, and the like. The polymerization of such diene monomers in an organic solvent results in the formation of a polymer cement of the rubbery elastomer (a highly viscous solution of the rubbery polymer in the organic solvent).

The catalyst utilized in preparing the cement of the rubbery elastomer can be killed before the crystalline polymer is synthesized in the rubbery cement. However, it is not always necessary or desirable to kill the catalyst utilized in preparing the rubbery elastomer. In other words, in some cases it is not desirable to kill the catalyst used in preparing the rubbery elastomer. Additional and/or different monomers can be added to the cement of the rubbery elastomer prior to the preparation of the crystalline polymer therein. In most cases a catalyst system which will promote the polymerization of unsaturated monomers into the crystalline polymer will be added to the cement of the rubbery elastomer.

Virtually any type of crystalline polymer that can be prepared under solution polymerization conditions can be synthesized in the cement of the rubbery polymer. Accordingly, it is possible to prepare highly dispersed blends of virtually any type of crystalline polymer with virtually any type of rubbery elastomer by utilizing the techniques of this invention. However, it is necessary for the crystalline polymer to be capable of being solution polymerized in a cement of the rubbery elastomer.

In some cases, the monomer utilized in preparing the crystalline polymer can be the same as the monomer utilized in preparing the rubbery elastomer. For example, syndiotactic-1,2-polybutadiene (SPBD) is a crystalline thermoplastic polymer and cis-1,4-polybutadiene is a rubbery elastomer. In other cases, the monomer utilized in preparing the crystalline polymer will be different from the monomer utilized in preparing the rubbery elastomer. Some representative examples of crystalline polymers that can be dispersed in rubbery elastomers by utilizing the techniques of this invention include polyethylene, polypropylene, SPBD, and trans-1,4-polybutadiene.

A highly dispersed blend of the crystalline polymer in the rubbery elastomer can be recovered from the rubber cement containing the crystalline polymer. The rubber cement containing the crystalline polymer is essentially a homogeneous solution due to mixing which is provided during the synthesis of the crystalline polymer. The highly dispersed blends of this invention can be recovered from the organic solvent in the rubber cement by utilizing conventional techniques. For instance, the highly dispersed blends of this invention can be recovered by coagulation or by evaporation. In many cases, it will be desirable to coagulate the highly dispersed blend from the rubber cement and to subsequently remove remaining solvent by evaporation. The highly dispersed blend which is recovered can then be utilized in manufacturing a wide variety of useful articles.

SPBD in High Cis-1,4-polybutadiene Blend

SPBD can be incorporated into synthetic elastomers such as high cis-1,4-polybutadiene, in order to improve the green strength thereof. Accordingly, the green strength of cis-1,4-polybutadiene which is utilized in building tires can be improved by incorporating SPBD therein. The incorporation of SPBD into high cis-1,4-polybutadiene which is utilized in the supporting carcass of tires is of particular value because the supporting carcass (reinforcing carcass) of tires is particularly prone to distortion during tire building and curing procedures. The green strength of such blends generally increases with increasing melting temperatures of the SPBD utilized in the blend. Highly dispersed blends of SPBD having a melting point of greater than 190° C. can be easily prepared utilizing the technique of this invention. Such blends which are designed for use in the supporting carcass for tires generally contain from about 1 to about 25 phr (parts per hundred parts of rubber) of SPBD.

Such blends can be prepared by first synthesizing the cis-1,4-polybutadiene in an organic solvent under solution polymerization conditions. This can be accomplished by polymerizing 1,3-butadiene monomer in a continuous or batch polymerization process using a three-component nickel catalyst system. This three-component nickel catalyst system includes an organoaluminum compound, a soluble nickel containing compound, and a fluorine containing compound.

The organoaluminum compound that can be utilized has the structural formula:

in which $R_1$ is selected from the group consisting of alkyl groups (including cycloalkyl), aryl groups, alkaryl groups, arylalkyl groups, alkoxy groups, hydrogen and fluorine; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H), and diethyl aluminum fluoride.

The component of the catalyst which contains nickel can be any soluble organonickel compound. These soluble nickel compounds are normally compounds of nickel with a mono-dentate or bi-dentate organic ligands containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthenate, nickel octanoate, nickel neodecanoate, bis($\alpha$-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\pi$-allyl nickel), bis($\pi$cycloocta-1,5-diene), bis($\pi$-allyl nickel trifluoroacetate), and nickel tetracarbonyl. The preferred component containing nickel is a nickel salt of a carboxylic acid or an organic complex compound of nickel. Nickel naphthenate, nickel octanoate, and nickel neodecanoate are highly preferred soluble nickel containing compounds. Nickel 2-ethylhexanoate, which is commonly referred to as nickel octanoate (NiOct) is the soluble nickel containing compound which is most commonly used due to economic factors.

The fluorine containing compound utilized in the catalyst system is generally hydrogen fluoride or boron trifluoride. If hydrogen fluoride is utilized, it can be in the gaseous or liquid state. It, of course, should be anhydrous and as pure as possible. The hydrogen fluoride can be dissolved in an inert solvent, and thus, can be handled and charged into the reaction zone as a liquid solution. Optionally, butadiene monomer can be utilized as the solvent. Inert solvents include alkyl-, alkaryl-, arylalkyl-, and aryl-hydrocarbons. For example, benzene and toluene are convenient solvents.

The boron trifluoride component of the catalyst can be gaseous boron trifluoride. It should also be anhydrous and as pure as possible.

The hydrogen fluoride and/or boron trifluoride can also be utilized as complexes in the catalyst system as the fluorine containing compound. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitriles and water.

The ketone subclass can be defined by the formula

wherein R' and R are selected from the group consisting of alkyl radicals, cycloalkyl radicals, aryl radicals, alkaryl radicals, and arylalkyl radicals containing from 1 to about 30 carbon atoms; and wherein R' and R can be the same or different. These ketones represent a class of compounds which have a carbon atom attached by a double bond to oxygen. Some representative examples of ketones that are useful in the preparation of the ketone-hydrogen fluoride complexes or boron trifluoride complexes of this invention include dimethyl ketone, methylethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones that can be used to form the ketone-hydrogen fluoride compounds and the ketone-boron trifluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex or boron trifluoride nitrile complex is the hydrogen fluoride benzonitrile complex or the boron trifluoride benzonitrile complex.

The alcohol subclass can be defined by the formula ROH where R represents alkyl radicals, cycloalkyl radicals, aryl radicals, alkaryl radicals, or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes and boron trifluoride complexes are methanol, ethanol, n-propanol, isopropanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl radicals, cycloalkyl radicals, aryl radicals, alkaryl radicals, and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether and the like. The preferred hydrogen fluoride ether complexes or boron trifluoride-ether complexes are hydrogen fluoride diethyl etherate, hydrogen fluoride dibutyl etherate, boron trifluoride diethyl etherate, boron trifluoride dibutyl etherate complexes.

The ester subclass can be defined by the formula

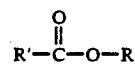

wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

Such complexes are usually prepared by simply bubbling gaseous boron trifluoride or hydrogen fluoride into appropriate amounts of the complexing agent, for instance, a ketone, an ether, an ester, an alcohol, or a nitrile. This should be done in the absence of moisture, and measures should be taken to keep the temperature from rising above about 100° F. (37.7° C.). In most cases, boron trifluoride and hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations can be determined by weight gain or chemical titration.

The three component catalyst system utilized can be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, acetylenic hydrocarbons, triolefins, vinyl ethers and aromatic nitriles.

Some representative examples of olefins that can be used as the preforming agent in the preparation of stabilized catalysts are trans-2-butene, mixed cis- and trans-2-pentene, and cis-2-pentene. Some nonconjugated diolefins that can be used as preforming agents are cis-1,4-hexadiene, 1,5-heptadiene, 1,7-octadiene, and the like. Representative examples of cyclic nonconjugated multiolefins that can be used include 1,5-cyclooctadiene, 1,5,9-cyclododecatriene, and 4-vinyl cyclohexene-1. Some representative examples of acetylenic hydrocarbons which can be used as the preforming agent are methyl acetylene, ethyl acetylene, 2-butyne, 1-pentyne, 2-pentyne, 1-octyne, and phenyl acetylene. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6-octadiene), and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene, and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound. The nickel compound is then added to the solution and then the fluoride compound is added to the solution. As an alternative, the preforming agent and the nickel compound may be mixed, followed by the addition of the organoaluminum compound and then the fluoride compound. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period, for example 15 to 30 minutes, at a moderate temperature, for example 50° C., increases the activity of the preformed catalyst greatly.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The three component nickel catalyst system can also be premixed. Such premixed catalyst systems are prepared in the presence of one or more polymeric catalyst stabilizers. The polymeric catalyst stabilizer can be in the form of a monomer, a liquid polymer, a polymer cement, or a polymer solution. Polymeric catalyst stabilizers are generally homopolymers of conjugated dienes or copolymers of conjugated dienes with styrenes and methyl substituted styrenes. The diene monomers used in the preparation of polymeric catalyst stabilizers normally contain from 4 to about 12 carbon atoms. Some representative examples of conjugated diene monomers that can be utilized in making such polymeric catalyst stabilizers include isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptaidene, 2,3-dimethyl-1,3-octadiene and 2,3-dimethyl-1,3-nonadiene and mixtures thereof.

Some representative examples of polymeric catalyst stabilizers include polyisoprene, polybutadiene, polypiperylene, copolymers of butadiene and styrene, copolymers of butadiene and α-methylstyrene, copolymers of isoprene and styrene, copolymers of isoprene and α-methylstyrene, copolymers of piperylene and styrene, copolymers of piperylene and α-methylstyrene, copolymers of 2,3-dimethyl-1,3-butadiene and styrene, copolymers of 2,3-dimethyl butadiene and α-methylstyrene, copolymers of butadiene and vinyltoluene, copolymers of 2,3-dimethyl-1,3-butadiene and vinyltoluene, copolymers of butadiene and β-methylstyrene, and copolymers of piperylene and β-methylstyrene.

In order to properly stabilize the catalyst system by this premixing technique, the polymeric catalyst stabilizer must be present before the organoaluminum compound has an opportunity to react with either the nickel compound or the fluorine containing compound. If the catalyst system is premixed without the presence of at least a small amount of polymeric catalyst stabilizer, the chemical effect of the organoaluminum compound upon the nickel compound or the fluoride compound is such that the catalytic activity of the catalyst system is greatly lessened and shortly thereafter rendered inactive. In the presence of at least a small amount of polymeric catalyst stabilizer, the catalytic or shelf life of the catalyst system is greatly improved over the same system without any polymeric catalyst stabilizer present.

One method of preparing this premixed catalyst system so that it will be highly active and relatively chemically stable is to add the organoaluminum compound to the polymer cement solution and mix thoroughly before the organoaluminum compound comes into contact with the nickel containing compound. The nickel compound is then added to the polymer cement solution. Alternatively, the nickel compound can be mixed with the polymer cement first, followed by the addition of the organoaluminum compound. Then the fluorine containing compound is added to the polymer cement solution. This is not intended to preclude other orders or methods of catalyst addition, but it is emphasized that the polymer stabilizer must be present before the organoaluminum compound has a chance to react with either the nickel containing compound or the fluorine containing compound.

The amount of polymeric catalyst stabilizer used to premix the catalyst system can be within the range of about 0.01 to 3 weight percent of the total amount monomer to be polymerized. Expressed as a weight ratio of polymeric catalyst stabilizer to nickel, the amount of polymeric catalyst stabilizer present during the premixing step can be within the range of about 2 to 2000 times the concentration of nickel. The preferred weight ratio of polymeric catalyst stabilizer to nickel is from about 4:1 to about 300:1. Even though such premixed catalyst systems show catalytic activity immediately after being prepared, it has been observed that a short aging period, for example 15 to 30 minutes, at moderate temperatures, for example 50° C., increases the activity of the preformed catalyst system.

A "modified in situ" technique can also be used in making the three component nickel catalyst system. In fact, the utilization of catalysts made by such "modified in situ" techniques results in more uniform control of the polymerization and the polymeric product. In such a "modified in situ" technique, the organoaluminum compound is added to neat 1,3-butadiene monomer with the nickel containing compound being added later. The butadiene monomer containing the organoaluminum compound and the nickel containing compound is then charged into the reaction zone being used for the polymerization with the fluorine containing compound being charged into the reaction zone separately. Normally, the organoaluminum compound and the nickle containing compound are charged into the reaction zone soon after being mixed into the butadiene monomer. In most cases, the organoaluminum compound and the nickel containing compound are charged into the reaction zone within 60 seconds after being mixed in the butadiene monomer. It will generally be desirable to utilize organoaluminum compounds and nickel containing compounds which have been dissolved in a suitable solvent.

The three component nickel catalyst systems utilizes in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range. Polymerizations can be carried out utilizing a mole ratio of the organoaluminum compound to the nickel containing compound within the range of from about 0.3:1 to about 300:1; with the mole ratio of the fluorine containing compound to the organonickel containing compound ranging from about 0.5:1 to about 200:1 and with the mole ratio of the fluorine containing compound to the organoaluminum compound ranging from about 0.4:1 to about 10:1. The preferred mole ratios of the organoaluminum compound to the nickel containing compound ranges from about 2:1 to about 80:1, the preferred mole ratio of the fluorine containing compound to the nickel containing compound ranges from about 3:1 to about 100:1, and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design, and other factors.

The three component nickel catalyst system can be continuously charged into the reaction zone utilized in carrying out continuous solution polymerization at a rate sufficient to maintain the desired catalyst concentration. The three catalyst components can be charged into the reaction zone "in situ", or as has been previously described, as a preformed or premixed catalyst system. In order to facilitate charging the catalyst components into the reaction zone "in situ" they can be dissolved in a small amount of an inert organic solvent or butadiene monomer. Preformed and premixed catalyst systems will, of course, already be dissolved in a solvent. The polymerization medium being utilized will normally contain about 5 weight percent to about 35 weight percent monomers and polymer with about 65 weight percent to 95 weight percent of the polymerization medium being solvent.

One or more molecular weight regulators can also be included in the polymerization medium. The molecular weight regulators which can be used include those which are known to be useful in solution polymerizations of 1,3-butadiene monomer which utilize nickel catalyst systems, such as those disclosed in U.S. Pat. No. 4,383,097 and South African Patents 83/2555, 83/2557 and 83/2558, which are incorporated herein by reference. These molecular weight regulators are selected from the group consisting of α-olefins, cis-2-butene, trans-2-butene, allene, 1,4-pentadiene, 1,5-hexadiene, 1,6-heptadiene, 1,2,4-trivinylcyclohexene, 1-trans-4-hexadiene, and 4-vinyl-1-cyclohexene. The α-olefins that can be utilized generally contain from 2 to about 10 carbon atoms. Some representative examples of α-olefins that can be utilized for this purpose include ethylene, propylene, 1-butene, 1-pentene, and 1-hexene. 1-butene is a preferred molecular weight regulator. This is because it has a boiling point of −6.3° C. which is very close to the boiling point of 1,3-butadiene (−4.5° C.) and because it is effective as a molecular weight regulator at low concentrations and is not a poison to the polymerization catalyst even if its concentration increases markedly.

The amount of molecular weight regulator that needs to be employed varies with the type of molecular weight regulator being utilized, with the catalyst system, with the polymerization temperature, and with the desired molecular weight of the polymer being synthesized. For instance, if a high molecular weight polymer is desired, then a relatively small amount of molecular weight regulator is required. On the other hand, in order to reduce molecular weights substantially, relatively larger amounts of the molecular weight regulator will be utilized. Generally, greater amounts of the molecular weight regulator are required when the catalyst system being utilized contains hydrogen fluoride or is an aged catalyst which contains boron trifluoride. Extremely effective molecular weight regulators, for example allene, can be used in lower concentrations and will nevertheless suppress molecular weights to the same degree as do more typical molecular weight regulators at higher concentrations. More specifically, allene will suppress the molecular weight of the polymer being synthesized in the solution polymerization when utilized at concentrations as low as 0.005 phm (parts per hundred parts of monomer). Generally, the molecular weight regulator will be utilized at a concentration ranging between about 0.005 phm and 20 phm. It will normally be preferred for the molecular weight regulator to be utilized at a concentration of 0.1 phm to 15 phm with the most preferred concentration being between 1 phm and 10 phm.

In continuous polymerizations, the molecular weight regulator is continuously charged into the reaction zone at a rate sufficient to maintain the desired concentration of the molecular weight regulator in the reaction zone. Even though the molecular weight regulator is not consumed in the polymerization reaction, a certain amount of molecular weight regulator will need to be continuously added to compensate for losses. The total quantity of the 1,3-butadiene monomer, the catalyst system, the solvent, and the molecular weight regulator (if desired) charged into the reaction zone per unit time is essentially the same as the quantity of high cis-1,4-polybutadiene cement withdrawn from the reaction zone within that unit of time.

High cis-1,4-polybutadiene can also be prepared under solution polymerization conditions utilizing rare earth catalyst systems, such as lathanide systems, which are normally considered to be "pseudo-living". Such rare earth catalyst systems are comprised of three components. These components include (1) an organoaluminum compound, (2) an organometallic compound which contains a metal from Group III-B of the Periodic System, and (3) at least one compound which contains at least one labile halide ion. The organoaluminum compound which can be utilized in conjunction with such rare earth catalyst systems are the same as those described for utilization in conjunction with the three component nickel catalyst system previously described.

In the organometallic compound which contains a metal from Group III-B of the Periodic System the metal ion forms the central core of atom to which ligand-type groups or atoms are joined. These compounds are sometimes known as coordination-type compounds. These compounds may be symbolically represented as $ML_3$ wherein M represents the above-described metal ions of Group III-B and L is an organic ligand containing from 1 to 20 carbon atoms selected from a group consisting of (1) o-hydroxyaldehydes, (2) o-hydroxyphenones, (3) aminophenols, (4) hydroxy esters, (5) hydroxy quinolines (6) β-diketones, (7) monocarboxylic acids, (8) ortho dihydric phenols, (9) alkylene glycols, (10) dicarboxylic acids, (11) alkylated derivatives of dicarboxylic acids and (12) phenolic ethers.

The Group III-B metals which are useful in the organometallic compound include scandium, yttrium, the lanthanides, and the actinides. The lanthanides include lanthanum, cerium, praseodymium, neodymium, promethium, samarium, europium, gadolinium, terbium, dysprosium, holmium, erbium, thulium, ytterbium and lutetium. The actinides include actinium, thorium, protactinium, uranium, neptunium, plutonium, americium, curium, berkelium, californium, einsteinium, fermium, mendelerium, and lawrencium. The preferred actinides are thorium and uranium which have atomic numbers of 90 and 92, respectively. The preferred Group III-B metals are cerium, praseodymium, neodymium and gadolinium which have atomic numbers of 58, 59, 60, and 64 respectively. The most preferred lanthanide metal is neodymium.

In the organometallic compound utilized the organic portion includes organic type ligands or groups which contain from 1 to 20 carbon atoms. These ligands can be of the monovalent and bidentate or divalent and bidentate form. Representative of such organic ligands or groups are (1) o-hydroxyaldehydes such as salicylaldehyde, 2-hydroxyl-1-naphthaldehyde, 2-hydroxy-3-naphthaldehyde and the like; (2) o-hydroxyphenones such as 2'-hydroxyacetophenone, 2'-o-hydroxybutyrophenone, 2'-hydroxypropiophenone and the like; (3) aminophenols such as o-aminophenol, N-methyl o-aminophenol, N-ethyl o-aminophenol and the like; (4) hydroxy esters such as ethyl salicylate, propyl salicylate, butyl salicylate and the like; (5) phenolic compounds such as 2-hydroxyquinoline, 8-hydroxyquinoline and the like; (6) β-diketones such as acetylacetone, benzoylacetone, propionylacetone, isobutyrylacetone, valerylacetone, ethylacetylacetone and the like; (7) monocarboxylic acids such as acetic acid, propionic acid, valeric acid, hexanoic acid, 2-ethylhexanoic acid, neodecanoic acid, lauric acid, stearic acid and the like; (8) ortho dihydric phenols such as pyrocatechol; (9) alkylene glycols such as ethylene glycol, propylene glycol, trimethylene glycol, tetramethylene glycol and the like; (10) dicarboxylic acids such as oxalic acid, malonic acid, maleic acid, succinic acid, o-phthalic acid and the like; (11) alkylated derivatives of the above-described dicarboxylic acids; (12) phenolic ethers such as o-hydroxyanisole, o-hydroxyethyl phenol ether and the like.

Representative organometallic compounds of the Group III-B metals, corresponding to the formula $ML_3$, which may be useful in this invention include cerium acetylacetonate, cerium naphthenate, cerium neodecanoate, cerium octanoate, tris-salicylaldehyde cerium, cerium tris-(8-hydroxyquinolate), gadolinium naphthenate, gadolinium neodecanoate, gadolinium octanoate, lanthanum naphthenate, lanthanum octanoate, neodymium naphthenate, neodymium neodecanoate, neodymium octanoate, praseodymium naphthenate, prasodymium octanoate, yttrium acetylacetonate, yttrium octanoate, dysprosium octanoate, tris($\pi$-allyl) uranium chloride, tris($\pi$-allyl) uranium bromide, tris($\pi$-allyl) uranium iodide, uranium tetramethoxide, uranium tetraethoxide, uranium tetrabutoxide, uranium octanoate, thorium ethoxide, tris($\pi$-allyl) thorium chloride, thorium naphthenate, uranium isovalerate, and other Group III-B metals complexed with ligands containing form 1 to 20 carbon atoms.

The third catalyst component utilized in such rare earth catalyst systems is a compound which contains a halide ion. Some representative examples of halide ions which can be utilized include bromide ions, chloride ions, fluoride ions, and iodide ions. A combination of two or more of these ions can also be utilized. These halide ions can be introduced as (1) hydrogen halides; (2) alkyl, aryl, alkaryl, aralkyl and cycloalkyl metal halides wherein the metal is selected from the Groups II, III-A and IV-A of the Periodic Table; (3) halides of metals of Groups III, IV, V, VI-B and VIII of the Periodic Table and (4) organometallic halides corresponding to the general formula $ML_{(3-y)}X_y$ wherein M is a metal selected from the group consisting of metals of Group III-B of the Periodic Table having atomic numbers of 21, 39 and 57 through 71 inclusive; L is an organic ligand containing from 1 to 20 carbon atoms and selected from the group consisting of (a) o-hydroxyaldehydes, (b) o-hydroxyphenones, (c) hydroxyquinolines, (f) β-diketones, (g) monocarboxylic acids, (h) ortho dihydric phenols, (i) alkylene glycols, (j) dicarboxylic acids, (k) alkylated derivatives of dicarboxylic acids and (l) phenolic ethers; X is a halide ion and y is an integer ranging from 1 to 2 and representing the number of halide ions attached to the metal M. The organic ligand L may be of the monovalent and bidentate or divalent and bidentate form.

Representative examples of such compounds containing a labile halide ion include (1) inorganic halide acids, such as hydrogen bromide, hydrogen chloride and hydrogen iodide; (2) organometallic halides, such as ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) inorganic halides, such as aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like; and (4) organometallic (Group III-B) halides, such as t-butylsalicylaldehydrocerium (iii) chloride, salicylaldehydrocerium (iii) chloride, 5-cyclohexylsalicylaldehydrocerium (iii) chloride, 2-acetylphenolatocerium (iii) chloride, oxalatocerium (iii) chloride, oxalatocerium (iii) bromide and the like. The preferred compounds which contain a labile halide ion are inorganic halide acids and organometallic halides.

The rare earth metal catalyst system can be prepared using an "in situ" technique or it can be "preformed." By "in situ" is meant that the catalyst components are added separately to the monomer to be polymerized. By "preformed" is meant the manner in which the catalyst components are mixed together prior to exposure of any of the components to the monomer to be polymerized. It is also known that when employing the type of catalyst system described in this invention, the presence of monomer is not essential to the formation of an active catalyst species, thus, facilitating the use of "preformed" catalysts. Also, it is known that freshly "preformed" catalysts are frequently more active than catalysts which have been allowed to age before use. Greatly improved "preformed" catalysts can be prepared by carrying out the "preforming" in the presence of small amounts of conjugated diolefins. Preforming in the presence of monomers results in homogeneous (soluble) catalyst systems, whereas those prepared by mixing in the absence of monomers are frequently heterogeneous (insoluble). Such a "preforming" technique is described in detail in U.S. Pat. No. 3,794,604 which is incorporated herein by reference.

The proportions of the components of the polymerization catalyst compositions of this invention can be varied widely. When the halide ion of the halogen containing compound is bromide, chloride or iodide ion, the atomic ratio of the halide ion to the Group III-B metal can vary from about 0.1/1 to about 6/1. A more preferred ratio is from about 0.5/1 to about 3.5/1 and the most preferred ratio is about 2/1. However, when the halide ion of the halogen-containing compound is fluoride ion, the ratio of the fluoride ion to the Group III-B metal ion ranges from about 20/1 to about 80/1 with the most preferred ratio being about 30/1 to about 60/1. The molar ratio of the trialkylaluminum or alkylaluminum hydride to Group III-B metal can range from about 4/1 to about 200/1 with the most preferred range being from about 8/1 to about 100/1. The molar ratio of diolefin to Group III-B metal can range from about 0.2/1 to 3000/1 with the most preferred range being from about 5/1 to about 500/1.

The amount of rare earth catalyst charged to the reduction system can be varied over a wide range; the sole requirement being that a catalytic amount of the catalyst composition, sufficient to cause polymerization of the 1,3-butadiene monomer, be present in the reaction system. Low concentrations of catalyst are desirable in order to minimize ash problems. It has been found that polymerizations will occur when the catalyst level of the Group III-B metal varies between 0.05 and 1.0 millimole of Group III-B metal per 100 grams of monomer. A preferred ratio is between 0.1 and 0.3 millimole of Group III-B metal per 100 grams of monomer.

The concentration of the total catalyst system employed, of course, depends upon factors such as purity of the system, polymerization rate desired, temperature and other factors. Therefore, specific concentrations cannot be set forth except to say that catalytic amounts are used.

Temperatures at which such polymerization reactions employing rare earth catalyst systems are carried out can be varied over a wide range. Usually the temperature can be varied from extremely low temperatures such as −60° C. up to high temperatures such as 150° C. or higher. Thus, temperature is not a critical factor in the polymerization of 1,3-butadiene monomer with rare earth catalyst systems. It is generally preferred, however, to conduct the polymerization reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

Vinyl halides can be utilized in conjunction with rare earth catalyst systems as molecular weight regulators as described in U.S. Pat. No. 4,663,405 to Throckmorton which is incorporated herein by reference. The vinyl halides that can be utilized as molecular weight regulators include vinyl fluoride, vinyl chloride, vinyl bromide and vinyl iodide. Vinyl bromide, vinyl chloride and vinyl iodide are preferred. Generally, vinyl chloride and vinyl bromide are most preferred. The amount of vinyl halide utilized will vary with the molecular weight which is desired for the polymer being synthesized. Naturally, the use of greater quantities of the vinyl halide results in the production of a polymer having lower molecular weights. As a general rule, from about 0.05 to 10 phm (parts per hundred parts of monomer) of a vinyl halide will be utilized. In most cases from 0.1 phm to 2.5 phm of a vinyl halide will be present during the polymerization. Persons skilled in the art will be able to easily ascertain the amount of vinyl halide in order to produce a polymer having a specifically desired molecular weight.

Metals from Groups I and II of the Periodic System can also be utilized as catalysts for polymerizing 1,3-butadiene monomer into 1,4-polybutadiene. The utilization of initiator systems of this type results in the formation of "living" polymers. The metals which are most commonly utilized in initiator systems of this type include barium, lithium, magnesium, sodium, and potassium. Lithium and magnesium are the metals that are most commonly utilized in such initiator systems. The metal initiator systems which are most commonly utilized in polymerizing butadiene monomer into polybutadiene are in the form of organometallic compounds. For instance, lithium is commonly utilized to catalyze such polymerizations in the form of an organoaluminum compound. Such organoaluminum compounds generally having the structural formula: Li-R, wherein R represents an alkyl group containing from 1 to 20 carbon atoms. More commonly, the alkyl group in such alkyl lithium compounds will contain from 2 to 8 carbon atoms. For instance, butyl lithium is very commonly utilized as the initiator for such polymerizations.

It is possible to prepare polybutadiene cements utilizing catalyst systems other than those described herein. It is also contemplated that such polybutadiene cements can be utilized in preparing the blends of this invention. In any case, the cis-1,4-polybutadiene cement is utilized as the polymerization medium for the synthesis of the SPBD. It will generally be desirable to add additional butadiene monomer to the cis-1,4-polybutadiene cement for the synthesis of the SPBD. In some cases, it will also be desirable to add additional solvent. The amount of monomer added will be contingent upon the proportion of SPBD desired in the blend being prepared. It will, of course, also be necessary to add a catalyst system to the rubber cement which is capable of promoting a polymerization which results in the formation of SPBD.

SPBD can be prepared by polymerizing 1,3-butadiene monomer in the rubber cement in the presence of a catalyst composition which is comprised of: (1) an organometallic compound, (2) a transition metal compound, and (3) carbon disulfide. A detailed description of such catalyst systems is given in U.S. Pat. No. 3,778,424, which is herein incorporated by reference in its entirety.

The transition metal compounds that can be employed in the catalyst composition include: $\beta$-diketone complexes of cobalt; $\beta$-keto acid ester complexes of cobalt; cobalt solids of organic carboxylic acids; complexes of halogenated cobalt compounds of the formula $CoX_n$, wherein X represents a halogen atom and n represents 2 or 3, with an organic compound; and the like. The organometallic compounds that can be employed in the catalyst composition include: organoaluminum compounds of the formula: $AlR_3$; organolithium compounds of the formula: LiR; organomagnesium compounds of the formula: $MgR_2$ and the like. The preferred organometallic compounds are the organoaluminum compounds of the formula: $AlR_3$ and the organolithium compounds of the formula: LiR.

The catalyst compositions used can be microencapsulated by employing a prereaction process. In this prereaction process the organo-metallic component and the transition metal compound component of the catalyst composition are dissolved in an inert organic solvent with at least one polyene monomer. The ratio of the monomer to the transition metal compound in this catalyst component solution should be at least 1.0 and preferably about 25 by mole. This catalyst component solution is preferably prepared at a temperature of 10° C. to 50° C. and preferably contains 0.0005 to 1.0 percent by mole, more preferably 0.001 to 0.5 percent by mole of the transition metal compound and 0.001 to 10 percent by mole and more preferably, 0.03 to 5 percent by mole of the organometallic compound based on the amount by mole of monomer that will be polymerized in the main polymerization in the cis-1,4-polybutadiene cement.

The polymer produced is composed essentially of syndiotactic 1,2-polybutadiene and generally has a melting point of 70° C. to 210° C. The crystallinity and melting point of the polybutadiene produced by using this process can be controlled by adding hydrocarbon-soluble alcohols, ketones, nitriles, aldehydes or amides to the polymerization mixture.

A catalyst component solution can be prepared by dissolving at least one cobalt compound and at least one organoaluminum compound in an inert organic solvent containing at least one polyene monomer dissolved therein.

The cobalt compound is soluble in the inert organic solvent and is selected from the group consisting of
i. $\beta$-diketone complexes of cobalt;
ii. $\beta$-keto acid ester complexes of cobalt;
iii. cobalt salts of organic carboxylic acid having 1 to 25 carbon atoms, and
iv. complexes of halogenated cobalt compounds of the formula: $CoX_n$ wherein X represents a halogen atom and n represents 2 or 3, with an organic compound selected from the group consisting of tertiary amines, alcohols, tertiary phosphines, ketones and N,N-dialkylamides.

The $\beta$-diketone compound to form a complex with a cobalt atom is of the formula:

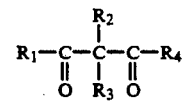

wherein $R_1$ and $R_4$, which are the same as or different from one another, are an alkyl radical of 1 to 6 carbon atoms and $R_2$ and $R_3$, which are the same as or different from one another, are a hydrogen atom or an alkyl radical having 1 to 6 carbon atoms. This type of $\beta$-diketone complex of cobalt may be cobalt (ii) acetylacetonate or cobalt (iii) acetylacetonate.

The $\beta$-keto acid ester to form a complex with a cobalt atom may be of the formula:

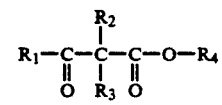

wherein $R_1$, $R_2$, $R_3$ and $R_4$ are the same as defined above. This type of cobalt complex may be a cobaltacetoacetic acid ethyl ester complex. The cobalt salt of organic carboxylic acid may be either cobalt octoate or cobalt naphthenate.

In the ligand compounds capable of forming a complex with a halogenated cobalt compound, the tertiary amine may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridine or ethyl alcohol.

The organoaluminum compounds which can be used are of the same types as those which are used in the three component nickel catalyst previously described herein for producing high cis-1,4-polybutadiene.

In the preparation of the catalyst component solution, it is desirable for the cobalt compound and the organoaluminum compound to be dissolved in the inert organic solvent containing at least one polyene. Some polyenes that can be used in the formation of the polyene products used to prepare microencapsulated catalysts are 1,3-butadiene, 1,3-pentadiene, isoprene, myrcene, and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. The polyene is preferably used in a ratio by mole of at least 1.0, more preferably, at least 5.0 to the amount by mole of the cobalt compound to be used in the catalyst component solution. The preferred polyenes for use in this invention are 1,3-butadiene, 1,3-pentadiene, isoprene, and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value at a ratio by mole of polyene monomer to the cobalt compound used in the catalyst component solution of between 10 and 200. For example, if a molar ratio of polyene monomer to the cobalt compound of 10,000 is employed the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of 10° to 50° C. and preferably contains 0.0005 to 1.0% by mole, more preferably 0.001 to 0.5% by mole, of the cobalt compound. 0.001 to 10% by mole, more preferably, 0.03 to 5% by mole of the organoaluminum compound based on the amount by mole of 1,3-butadiene to be polymerized. The ratio by mole of the organoaluminum compound to the cobalt compound is preferably in a range from 0.5 to 50, more preferably, from 0.2 to 10.

In the preparation of the catalyst component solution it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dehydrated inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If a sufficient amount of water is present in the inert organic solvent used in the preparation of the catalyst component solution the catalyst can be completely destroyed.

It is desirable to allow the prereaction used in the preparation of the catalyst component solution to run for a period of at least 30 seconds, and more preferably for at least 1 minute before mixing the catalyst component solution with the 1,3-butadiene/water mixture to form the reaction mixture. Longer time periods can be used without the catalyst component solution losing its activity.

After the catalyst component solution is prepared, it can be added to the high cis-1,4-polybutadiene cement containing 1,3-butadiene monomer. Agitation should be provided in order to ensure that the catalyst component solution and monomer are distributed essentially homogeneously throughout the mixture. The polymerization is initiated by mixing carbon disulfide throughout the rubber cement containing the above-described catalyst component solution.

The amount of carbon disulfide that can be added will vary between 0.005 mole percent and 2 mole percent based on the amount of moles of 1,3-butadiene to be polymerized in the rubber cement. More preferably the amount of carbon disulfide added will vary between 0.001 and 1 mole percent based on the amount of moles of 1,3-butadiene to be polymerized in the rubber cement.

The larger the proportion of the carbon disulfide in a range from about 0.0005 to about 0.5% by mole based on the amount by mole of the 1,3-butadiene to be polymerized in the rubber cement, the larger the yield of the polymer product obtained from the polymerization mixture. However, too large an amount of carbon disulfide, for example, larger than 0.5% by mole, causes a decrease in the polymer yield. As a general rule, the molar ratio of carbon disulfide to the cobalt compound will be greater than about 10:1.

It has been unexpectedly found that the ratio of carbon disulfide to the cobalt compound can be greatly reduced without sacrificing yields by prestabilizing the cobalt compound with an dialkyl fumarate. This prestabilization can be done by simply mixing the dialkyl fumarate into the polymerization medium containing the 1,3-butadiene monomer and catalyst component solution prior to adding the carbon disulfide thereto. In cases where the cobalt compound is prestabilized with a dialkyl fumarate a molar ratio of carbon disulfide to the cobalt compound which is within the range of about 1:4 to about 5:1 will generally be utilized. It is normally preferred for the molar ratio of the carbon disulfide to the prestabilized cobalt compound to be within the range of 1:3 to 3:1 with it being more preferred for this molar ratio to be within the range of 1:2 to 2:1.

The dialkyl fumarates which can be used in prestabilizing the cobalt compound are fumaric acid dialkyl esters having the structural formula:

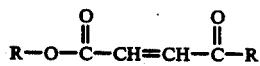

wherein R is an alkyl group containing from 1 to about 10 carbon atoms. It is normally preferred for R to represent an alkyl group containing from 1 to 4 carbon atoms. Fumaric acid diethyl ester is a highly preferred alkyl fumarate.

The molar ratio of dialkyl fumarate to cobalt compound used in prestabilizing the cobalt compound will normally be within the range of about 1:1 to about 30:1. It is generally preferred for the molar ratio of dialkyl fumarate to the cobalt compound to be within the range of 2:1 to 15:1 and more preferred for this molar ratio to be within the range of 5:1 to 10:1.

The crystallinity and melting point of the SPBD produced can be controlled by adding alcohols, ketones, nitriles, aldehydes, or amides to the polymerization mixture. A detailed description of the agents and techniques that are used to control crystallinity and melting points of SPBD is given in U.S. Pat. Nos. 3,901,868 and 4,153,767. These patents are incorporated herein by reference in their entirety.

The 1,3-butadiene monomer in the polymerization mixture is converted into polybutadiene while agitating the rubber cement. If the use of an antioxidant is desired, it may be added conveniently at the beginning of the polymerization. This polymerization of 1,3-butadiene monomer can be carried out at a temperature from about −20° C. to about 90° C. It is preferable for the polymerization temperature to be carried out at 0° C. to 40° C. The most preferred polymerization temperature is about 10° C.

This polymerization can be carried out either under a normal pressure or in a pressurized system. This polymerization of 1,3-butadiene monomer into SPBD can be carried out under a nitrogen atmosphere with good results. Such a polymerization can be run for a period of from about 1 to about 30 hours. It is generally preferred for the polymerization to be run for about 10 hours. However, the optimum polymerization time will vary greatly with the polymerization temperature, catalyst, the amount of catalyst used, etc. This polymerization of 1,3-butadiene monomer into SPBD can, of course, be done on a continuous basis.

After the SPBD has been synthesized in the rubber cement, the rubbery cis-1,4-polybutadiene and the SPBD can be simultaneously coagulated from the organic solvent in the rubber cement. The blend recovered is a highly dispersed blend of the crystalline SPBD through the rubbery high cis-1,4-polybutadiene. Residual amounts of solvent in the blend can, of course, be removed by evaporation or other suitable techniques.

Trans-1,4-polybutadiene in Cis-1,4-polybutadiene Blend

In preparing blends of trans-1,4-polybutadiene in high cis 1,4-polybutadiene, the high cis-1,4-polybutadiene can be prepared first in an inert organic solvent as was previously described with reference to preparing SPBD/cis-1,4-polybutadiene blends. The cis-1,4-polybutadiene cement is then utilized as the polymerization medium for the synthesis of the trans-1,4-polybutadiene.

Additional 1,3-butadiene monomer and additional organic solvent can be added to the rubber cement prior to the synthesis of the trans-1,4-polybutadiene. A catalyst system which is capable of promoting the polymerization of butadiene monomer into trans-1,4-polybutadiene is then introduced into the rubber cement containing butadiene monomer and the high cis-1,4-polybutadiene. Virtually any type of catalyst system which is capable of promoting such a polymerization which results in the formation of trans-1,4-polybutadiene can be utilized. For instance, vanadium acetyl acetonate/alkyl aluminum halide catalyst systems can be employed. Alkyl magnesium/potassium alkoxide catalyst systems are another representative example of a catalyst system which is capable of promoting the polymerization of butadiene monomer into trans-1,4-polybutadiene in the cement of the high cis-1,4-polybutadiene. After the trans-1,4-polybutadiene has been synthesized in the rubber cement, the polymers can be recovered from the organic solvent in the rubber cement utilizing conventional procedures, such as coagulation or evaporation. The blend recovered will, of course, be a highly dispersed blend of trans-1,4-polybutadiene in high cis-1,4-polybutadiene.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment a highly dispersed blend of trans-1,4-polybutadiene in high cis-1,4-polybutadiene was prepared. High cis-1,4-polybutadiene cement was prepared in the first step of this experiment. This was done by adding 500 mm of 1,3-butadiene monomer premix (19% in hexane) to a quart polymerization bottle with 1.2 ml of triisobutylaluminum (0.89M), 0.54 ml of nickel octanoate (0.05M), and 5.4 ml of hydrofluoric acid (0.5M). The nickel octanoate, triisobutylaluminum and hydrofluoric acid components of the catalyst system were all previously dissolved in hexane. 1,5-hexadiene was included in the premix in order to control the Mooney viscosity of the high cis-1,4-polybutadiene produced. The 1,5-hexadiene was present at a concentration of 2 phm (parts per hundred parts of monomer). The polymerization was conducted at 60° C. for a period of 4 hours.

The rubber cement produced by the polymerization was cooled to room temperature and 250 ml of additional 1,3-butadiene monomer was added to the rubber cement. The additional butadiene monomer was added as a 6% solution in hexane. The polymerization of the butadiene monomer into trans-1,4-polybutadiene was initiated by the addition of 1.6 ml of ethylaluminum sesquichloride (as a 0.71M solution in hexane) and 1.8 ml of vanadium acetyl acetonate (as a 0.01M solution in hexane). The polymerization was carried out at room temperature for a period of 16 hours. The polymerization was short stopped with a hexane solution containing methanol and an antioxidant. The polymer blend of trans-1,4-polybutadiene and cis-1,4-polybutadiene was recovered and dried under vacuum. A yield of 63.5 grams was recovered. The blend was determined to contain 2-3% trans-1,4-polybutadiene based upon differential scanning calorimetry. It was also determined to have a glass transition temperature of −106° C.

EXAMPLE 2

In this experiment a highly dispersed blend of polyethylene in high cis-1,4-polyisoprene was prepared. In the procedure utilized a cement of cis-1,4-polyisoprene was prepared by solution polymerization. In this procedure 500 ml of a 9.8% solution of isoprene in hexane was added to a polymerization bottle. The polymerization was initiated by adding n-butyl lithium catalyst system to the isoprene in hexane solution. The polymerization was allowed to proceed for a period of two hours at 60° C.

The polyisoprene cement formed was then treated with 3 ml of a 0.2M solution of titanium tetrachloride in toluene. Subsequently, 3 ml of a 0.4M solution of acetophenone in toluene was added. Then, 1.85 ml of a 0.89M solution of triisobutylaluminum in hexane was added. After these catalyst components were added to the rubber cement, 3.5 g of ethylene was added to the rubber cement. The rubber cement containing the catalyst and ethylene monomer was then rotated in a constant temperature bath at 30° C. for over 15 hours. A blend of polyethylene in cis-1,4-polyisoprene was recovered by coagulation in isopropanol. The blend recovered was determined (based on differential scanning calorimetry) to contain about 10% polyethylene. Its glass transition temperature was determined to be −65° C. and its melting point was determined to be 133° C.

EXAMPLE 3

In this experiment a highly dispersed blend of polyethylene in low vinyl polybutadiene was prepared. A polymer cement of low vinyl polybutadiene was prepared by charging 7 kilograms of a 16% solution of 1,3-butadiene monomer in hexane into a 5 gallon reactor. The polymerization was initiated by charging 22 ml of a 0.7M solution of normal-butyl lithium in hexane into the reactor at a temperature of 125° F. (52° C.). After a polymerization time of about 4 hours, a conversion of near 100% was attained. A catalyst system which was comprised of 10 millimoles of titanium tetrachloride in toluene, 20 millimoles of acetophenone in toluene and 27.5 millimoles of triisobutylaluminum in hexane were then added. After the catalysts were charged into the low vinyl polybutadiene cement, 112 grams of ethylene monomer was added. It took approximately 1 hour for the ethylene to be charged into the rubber cement. The rubber cement was agitated for 2 hours with the temperature being maintained at 125° F. (52° C.). A highly dispersed blend of polyethylene in low vinyl polybutadiene was recovered by coagulation in isopropyl alcohol containing an antioxidant. This coagulation procedure resulted in the recovery of 1,230 grams of polymer. It was determined to have a glass transition temperature of −94° C. and a melting point of 135° C. It was determined by differential scanning calorimetry that the blend recovered contained about 10% polyethylene.

EXAMPLE 4

In this experiment a highly dispersed blend of SPBD in high cis-1,4-polybutadiene was prepared. In the procedure utilized dry high cis-1,4-polybutadiene was first dissolved in hexane. The rubber cement formed was then utilized as the polymerization medium for the stereospecific polymerization of 1,3-butadiene monomer into SPBD.

1,3-butadiene monomer was charged into the high cis-1,4-polybutadiene cement. The polymerization was initiated by adding a cobalt octoate/triisobutylaluminum/carbon disulfide catalyst system. A conversion of 75 to 80 percent was achieved after a polymerization time of 8-24 hours at room temperature. A highly dispersed blend of SPBD in high cis-1,4-polybutadiene was then recovered by coagulation.

EXAMPLE 5

In this experiment a highly dispersed blend of SPBD in high cis-1,4-polyisoprene was prepared. In the procedure used 500 ml of an 11.1% isoprene in hexane solution containing 36 g of isoprene was added to a quart (0.946 liter) polymerization bottle. The polymerization was initiated by adding a triisopropylaluminum/titanium tetrachloride/diphenyl ether catalyst system (0.9 Al/Ti, 0.6 diphenyl ether/Al, 0.34M TiCl$_4$). The polymerization was conducted at 50° C. for a period of 4 hours. This resulted in the formation of a cis-1,4-polyisoprene cement. The cis-1,4-polyisoprene in the cement had a Mooney viscosity of about 77 to about 80. It is important for the polyisoprene employed in the highly dispersed blends of this invention to have a Mooney viscosity which is within the range of about 50 to about 100. The Mooney viscosity of the polyisoprene will normally be within the range of 70 to 85. The Mooney viscosities referred to herein are determined using a large rotor, a one minute warm-up time and a four minute running time at 100° C. After the cis-1,4-polyisoprene cement was allowed to cool to room temperature, 100 ml of a 18.6% solution of 1,3-butadiene in hexane was added to it. Polymerization was initiated by adding 8 ml of a 25% triisopropylaluminum solution, 2.5 ml of a 0.042M cobalt octanoate solution, and 0.2 ml of carbon disulfide. The polymerization was allowed to continue at room temperature with the polymerization bottle being shaken for a period of 16 hours. The polymerization was short stopped and stabilized. The blend recovered was dried in a vacuum oven. The blend recovered weighed 43 g and contained 7.2% SPBD. It was determined to have a glass transition temperature of −65° C. and a melting point of 202° C.

EXAMPLE 6

An isoprene-butadiene rubber was prepared in hexane using a n-butyl lithium/ N,N,N',N'-tetramethylethylene-diamine (TMEDA) (1:2) catalyst. Thus, TMEDA (0.56 ml, 1M in hexane) and n-butyl lithium (0.34 ml, 1M in hexane) were added to a quart (0.946 liter) bottle containing 500 ml of butadiene/isoprene (50/50, 17.3% in hexane) premix. The polymerization was allowed to continue for 4 hours at 64° C. The resulting polymer cement was cooled to room temperature and into it was added 250 ml of butadiene premix (8% in hexane), followed by 6.6 ml of ethylaluminum sesquichloride (0.71M in hexane) and 3.3 ml of vanadium acetyl acetonate (0.01M in hexane). The polymerization was continued at room temperature for 16 hours. After shortstopping the polymer was dried under vacuum and 58 g of polymer was obtained. It contained 2-3% trans-polybutadiene based on DSC and had a glass transition temperature of −25° C. and melting points at 64° C. and 119° C.

EXAMPLE 7

A cement was prepared by adding 0.4 ml of 1M n-butyl lithium (in hexane) and 0.1 ml of neat TMEDA to a quart (0.946 liter) bottle containing 500 ml of styrene/butadiene (16/84) premix (18.5% in hexane). the polymerization was carried out at 65° C. for 4 hours. This control SBR rubber had a Tg of −26° C. and ML−4=7. The resulting cement was then cooled to room temperature. 150 ml of 1,3-butadiene premix (10% in hexane) was then added to the above cement and followed by 10 ml of 25% triisopropylaluminum (TIBA), 0.4 ml of 0.42M cobalt octanoate (in hexane), and 0.15 ml of neat carbon disulfide ($CS_2$). The mixture was then agitated in a shaker at room temperature for 12 hours. The reaction was then short stopped with methanol and stabilized. Solvent was then evaporated and the polymer was vacuum dried at 50° C. overnight. The product (64 g) contained 6.3% SPBD, had a melting point of 203° C. and a glass transition temperature of −26° C. It also had a Mooney viscosity (ML-4) of 60.

EXAMPLE 8

The polystyrene cement was prepared by adding 0.28 ml of 1M n-butyl lithium (n-BuLi) to a quart (0.946 liter) bottle containing 23 g of styrene in 30 ml of cyclohexane. The polymerization was carried out at 65° C. for 4 hours. The resulting cement was then cooled to room temperature. Then 100 ml of 1,3-butadiene premix (21% in hexane) was then added to the above cement followed by the addition of 7.5 ml 25% triisobutylaluminum (in hexane), 0.3 ml 0.4M cobalt octanoate (in hexane), and 0.75 ml of 10% carbon disulfide (in hexane). The mixture was then agitated in a shaker at room temperature for 4 hours. Triisopropanolamine, permic acid and an antioxidant were then added to the reaction mixture. The mixture was coagulated in a mixture of methanol/isopropanol. The polymer (32 g) contained 24% of SPBD and had a melting point of 206° C.

EXAMPLE 9

A Kraton TM 1102 (20/60/20 styrene/butadiene/styrene) cement was prepared by dissolving 25 g of the polymer pellets in 600 ml of hexane in a quart (0.946 liter) bottle. 250 ml of 1,3-butadiene monomer premix (16% in hexane) was then added to the above cement followed by the addition of 12.5 ml of 25% triisobutylaluminum (in hexane), 0.5 ml of 0.42M cobalt octanoate, and 0.75 ml of 10% carbon disulfide. The mixture was then shaken at room temperature for 18 hours. The resulting mixture was then coagulated in a methanol solution. The resulting polymer (47 g) contained 42% SPBD, had a melting point of −206° C. and a glass transition temperature at −94° C.

EXAMPLES 10-17

This series of experiments show that the molar ratio of carbon disulfide to cobalt compound used in the synthesis of SPBD can be reduced to below 10:1 without sacrificing yields by prestabilizing the cobalt compound with diethyl fumarate. In this series of experiments 1,3-butadiene monomer was polymerized into SPBD in 8 oz. polymerization bottles. This was done by adding 21.7 grams of 1,3-butadiene in 180 ml. of hexane, 2.4 ml of a 25% solution of triisobutyl aluminum in hexane and 0.1 ml of a 0.042M solution of cobalt octanoate to each of the polymerization bottles. Then, fumaric acid diethyl ester was added to each of the bottles. The amount of fumaric acid diethyl ester added as a molar ratio to the cobalt octanoate is shown in Table I. After the mixtures in the bottles were shaken well, a 1% solution of carbon disulfide in hexane was added. The amount of carbon disulfide added as a molar ratio to the cobalt compound is also shown in Table I.

After the carbon disulfide was added, the polymerization bottles were agitated for 16 hours at room temperature. The SPBD cements were then coagulated with methanol and dried under vacuum at 40° C. Yields and the melting points of the SPBD samples made are reported in Table I.

TABLE I

| Example | $CS_2$: Cobalt | Diethyl Fumarate: Colbalt | Yield | $T_m$ |
|---|---|---|---|---|
| 10 | 1 | 0 | 30% | 206° C. |
| 11 | 3 | 0 | 29% | 206° C. |
| 12 | 5 | 0 | 60% | 206° C. |
| 13 | 10 | 0 | 66% | 207° C. |
| 14 | 1 | 3 | 72% | 205° C. |
| 15 | 1 | 5 | 82% | 206° C. |
| 16 | 1 | 7 | 84% | 206° C. |
| 17 | 1 | 9 | 88% | 205° C. |

While certain representative embodiments and details have bee shown for the purpose of illustrating the invention, it will be apparent to those skilled in this art that various changes and modifications can be made therein without departing from the scope of this invention.

What is claimed is:

1. A process for preparing a highly dispersed blend of syndiotactic-1,2-polybutadiene in a rubbery elastomer which comprises (1) polymerizing at least one diene monomer in an organic solvent under solution polymerization conditions to form a polymer cement of the rubbery elastomer in the organic solvent, (2) polymerizing 1,3-butadiene monomer in the polymer cement in the presence of a catalyst system which comprises (a) an organoaluminum compound, (b) a cobalt compound, (c) carbon disulfide, and (d) a dialkyl fumarate, which results in the formation of a rubber cement having syndiotactic 1,2-polybutadiene dispersed therein, wherein essentially all of the syndiotactic 1,2-polybutadiene is present in the form of a separate polymer, and (3) recovering the highly dispersed blend of the syndiotactic 1,2-polybutadiene in the rubbery elastomer from the organic solvent in the rubber cement.

2. A process for preparing a highly dispersed blend of syndiotactic 1,2-polybutadiene in a rubber elastomer which comprises (1) polymerizing 1,3-butadiene monomer in an organic solvent in the presence of a catalyst system which comprises (a) an organoaluminum compound, (b) a cobalt compound, (c) carbon disulfide, and (d) an dialkyl fumarate, which results in the formation of a polymer cement of the syndiotactic 1,2-polybutadiene in the organic solvent, (2) polymerizing at least one diene monomer in the polymer cement under conditions and in the presence of a catalyst which results in the formation of the rubbery elastomer to produce a rubber cement having syndiotactic 1,2-polybutadiene dispersed therein, wherein essentially all of the syndiotactic 1,2-polybutadiene is present in the form of a separate polymer, and (3) recovering the highly dispersed blend of the syndiotactic 1,2-polybutadiene in the rubbery elastomer from the organic solvent in the rubber cement.

3. A process as specified in claim 1 wherein the diene monomer is 1,3-butadiene and wherein the rubbery elastomer is cis-1,4-polybutadiene.

4. A process as specified in claim 3 wherein the cis-1,4-polybutadiene is prepared in the presence of a nickel catalyst system.

5. A process as specified in claim 3 wherein the cis-1,4-polybutadiene is prepared in the presence of a three component catalyst system which is comprised of (1) an organoaluminum compound, (2) an organometallic compound which contains a metal from Group III-B of the Periodic System and (3) at least one compound which contains at least one labile halide ion.

6. A process as specified in claim 3 wherein the cis-1,4-polybutadiene is prepared in the presence of a Group I or Group II metal catalyst system.

7. A process as specified in claim 6 wherein the Group I or Group II metal is lithium and wherein the lithium is in the form of an alkyl lithium compound.

8. A process as specified in claim 1 wherein the diene monomer is isoprene and wherein the rubbery elastomer is cis-1,4-polyisoprene.

9. A process as specified in claim 1 wherein the diene monomer is 1,3-butadiene and wherein the rubbery elastomer is medium vinyl polybutadiene having a vinyl content which is within the range of about 40% to about 60%.

10. A process as specified in claim 1 wherein the diene monomer is 1,3-butadiene and wherein the rubbery elastomer is high vinyl polybutadiene having a vinyl content of at least about 80%.

* * * * *